United States Patent [19]

Asano et al.

[11] Patent Number: 5,162,020
[45] Date of Patent: Nov. 10, 1992

[54] AUTOMOTIVE AIR-CONDITIONER WITH VARIABLE-LENGTH DAMPER

[75] Inventors: Hideo Asano, Gifu; Akihito Higashihara, Chiryu; Yasufumi Kojima, Gifu, all of Japan

[73] Assignee: Nippondenso Co., Ltd., Kariya, Japan

[21] Appl. No.: 676,717

[22] Filed: Mar. 29, 1991

[30] Foreign Application Priority Data

Mar. 30, 1990 [JP] Japan ................................ 2-83927

[51] Int. Cl.$^5$ ............................................. B60H 1/00
[52] U.S. Cl. ................................... 454/156; 165/103; 165/142; 165/143; 454/160
[58] Field of Search ................ 165/103, 142, 143; 454/148, 156, 159, 160

[56] References Cited

U.S. PATENT DOCUMENTS 4,515,208  5/1985  Sakurai et al. ................ 454/160 X

FOREIGN PATENT DOCUMENTS 2739252  3/1979  Fed. Rep. of Germany ...... 454/160
61-98609  6/1986  Japan .

Primary Examiner—Harold Joyce
Attorney, Agent, or Firm—Cushman, Darby & Cushman

[57] ABSTRACT

An air-conditioner has a heater core in an air passage. A bypass passage is formed within the air passage and at a side portion of the heater core. A holding shaft is pivotally disposed at the boundary between an air-flow through the heater core and an air-flow through the bypass passage. A sliding shaft is disposed upstream of the heater core and slides to cross a substantially whole area of the air passage. A first end and second end of a variable length damper which varies its length are connected to the sliding shaft and the holding shaft respectively so that the variable length damper moves in such a manner that its length varies in response to a distance between the sliding shaft and the holding shaft.

12 Claims, 4 Drawing Sheets

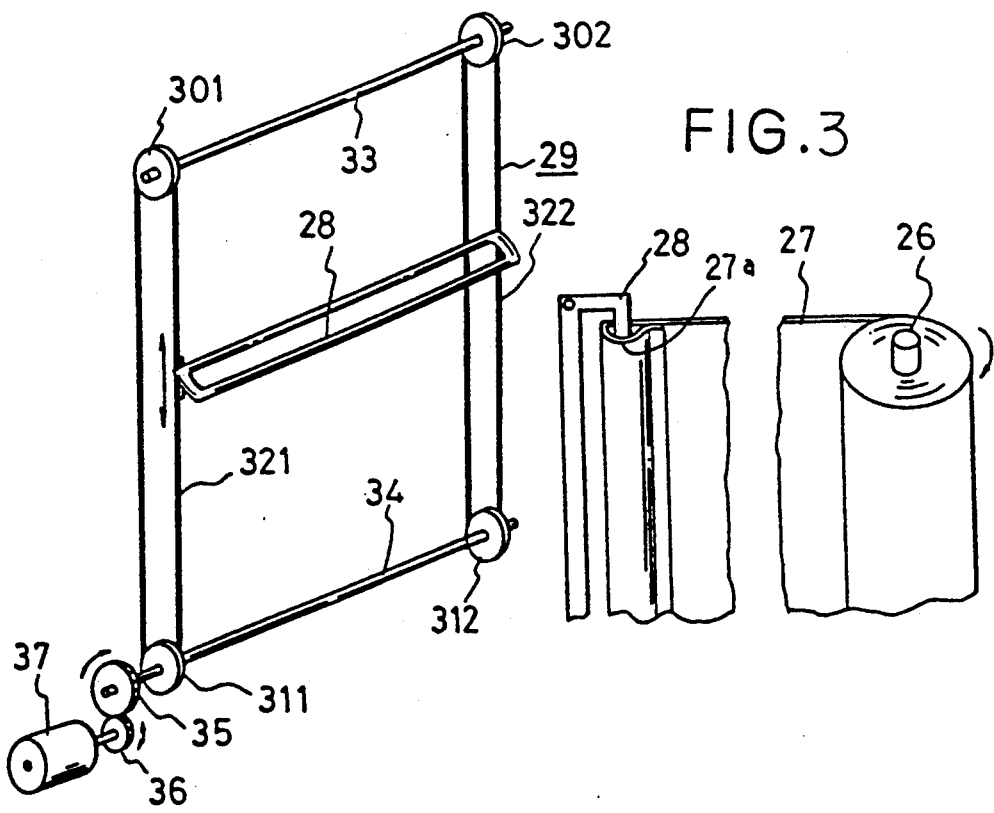

AUTOMOTIVE AIR-CONDITIONER WITH VARIABLE-LENGTH DAMPER

This application claims the priority of Japanese Patent Application No. 2-83927 filed Mar. 30, 1990, which is incorporated herein by reference.

BACKGROUND OF THE INVENTION

1. Field of the Invention

The present invention relates generally to an air-conditioner, more particularly, an air-conditioner having an improved air-mixing damper for modulating temperature of a discharged air into a passenger compartment.

2. Description of the Related Art

An automotive air-conditioner generally has an air-mixing damper as means for modulating temperature of an air discharged into a passenger compartment. An air-conditioner using a conventional air-mixing damper is shown in FIG. 8.

The air-conditioner comprises a duct 12 in which a fan 11 is accommodated. An evaporator 13 is disposed downstream of the fan 11 for cooling the air passing therethrough. A heater core 14 is disposed downstream of the evaporator 13 for heating the air passing therethrough. All the air from the fan 11 flows through the evaporator 13. However, the heater core 14 is so disposed in the duct 12 that a bypass passage 16 is defined between the heater core 14 and an inner wall of the duct 12. A heated air passage 15 is defined as a passage passing through the heater core 14. An air-mixing damper 17 having a holding shaft 18 is disposed at an edge of the heater core 14.

The holding shaft 18 is pivotally disposed in the duct 12 and at the boundary between the heated air passage 15 and the bypass passage 16.

The air-mixing damper 17 is controlled to rotate by the holding shaft 18.

The rotational movement of the air-mixing damper 17 varies an air-mixing ratio of a volume of the air flowing in the heated air passage 15 and a volume of the air flowing in the bypass passage 16.

For example, when the heated air passage 15 is blocked by the air-mixing damper 17, only a cooled air from the evaporator 13 is discharged into a passenger compartment (not shown), that is to say, it is in Max cooling Mode. Conversely when the bypass passage 16 is blocked by the air-mixing damper 17, only a heated air passing through the heater core 14 is discharged into the passenger compartment, that is to say, it is in Max Heat Mode.

The air-conditioner described above requires a large space, such as a semicircle with a radius of a length of the air mixing damper 17 so that a distance between the evaporator 13 and the heater core 14 is required more than the length of the air-mixing damper 17.

As a result, it is difficult to get a compact air-conditioner so as to install in a limited space of an automobile.

An improved air-conditioner is shown in Japanese Utility model laid-open publication No. 61-98609, which adopts a film damper as an air-mixing damper. The film damper has a width of as side as a half cross-sectional area of an air passage and is disposed downstream of an evaporator for blocking a half of an air-flow.

When the film damper is adopted in FIG. 8, the film damper is slidably moved in the air passage to selectively open and close a bypass passage 16 and a heated air passage 15 so that when the air-conditioner is operated in Bi-Level Mode, a half of a cross-sectional area of the air passage is always blocked by the film damper. It increases a resistance of an air-flow. Therefore, compared with the air-mixing damper 17 shown in FIG. 8, a volume of an air-flow is reduced in Bi-Level Mode.

SUMMARY OF THE INVENTION

Accordingly, it is a primary object of the present invention to provide a compact air-conditioner so that the air-conditioner can be installed in a very limited space. Another object of the present invention is to achieve a reduction of air-flowing resistance caused by an air-mixing damper in a duct.

To achieve the foregoing and other objects, the present invention employs a following elements. The air-conditioner according to the present invention has a duct accommodating a heater core therein. A bypass passage is defined between the heater core and an inner wall of the duct. The air flowing the bypass passage bypasses the heater core. A heated air passage is defined a passage passing through the heater core. A holding shaft is disposed in the duct and at the boundary between the bypass passage and the heated air passage. A variable length damper is employed as an air-mixing damper. A first end of the variable length damper is connected to the holding shaft. A second end of the variable length damper is connected to a sliding shaft. The sliding shaft is slidably disposed to cross a substantially whole area of an air passage formed in the duct. The length of the variable length damper itself varies in response to a straight distance between the holding shaft and the sliding shaft.

An air-mixing ratio of a heated air passing through the heated air passage and a cooled air passing through the bypass passage is modulated in response to a position of the sliding shaft. Since a space for the variable length damper is set depend on the distance between the holding shaft and the sliding shaft, and since the distance is able to be set in a very short length such as, shorter than the longest length of the variable length damper, it is effective in getting a compact air-conditioner.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings in which:

FIG. 2 is a perspective view of a transmitting means with a sliding shaft and a motor incorporated in the air-conditioner shown in FIG. 1;

FIG. 3 is a partially cutaway view in perspective of a variable length damper, a sliding shaft and a holding shaft in preferred embodiment incorporated in the air-conditioner shown in FIG. 1;

DETAILED DESCRIPTION OF THE PREFERRED EMBODIMENTS

Figure 1:
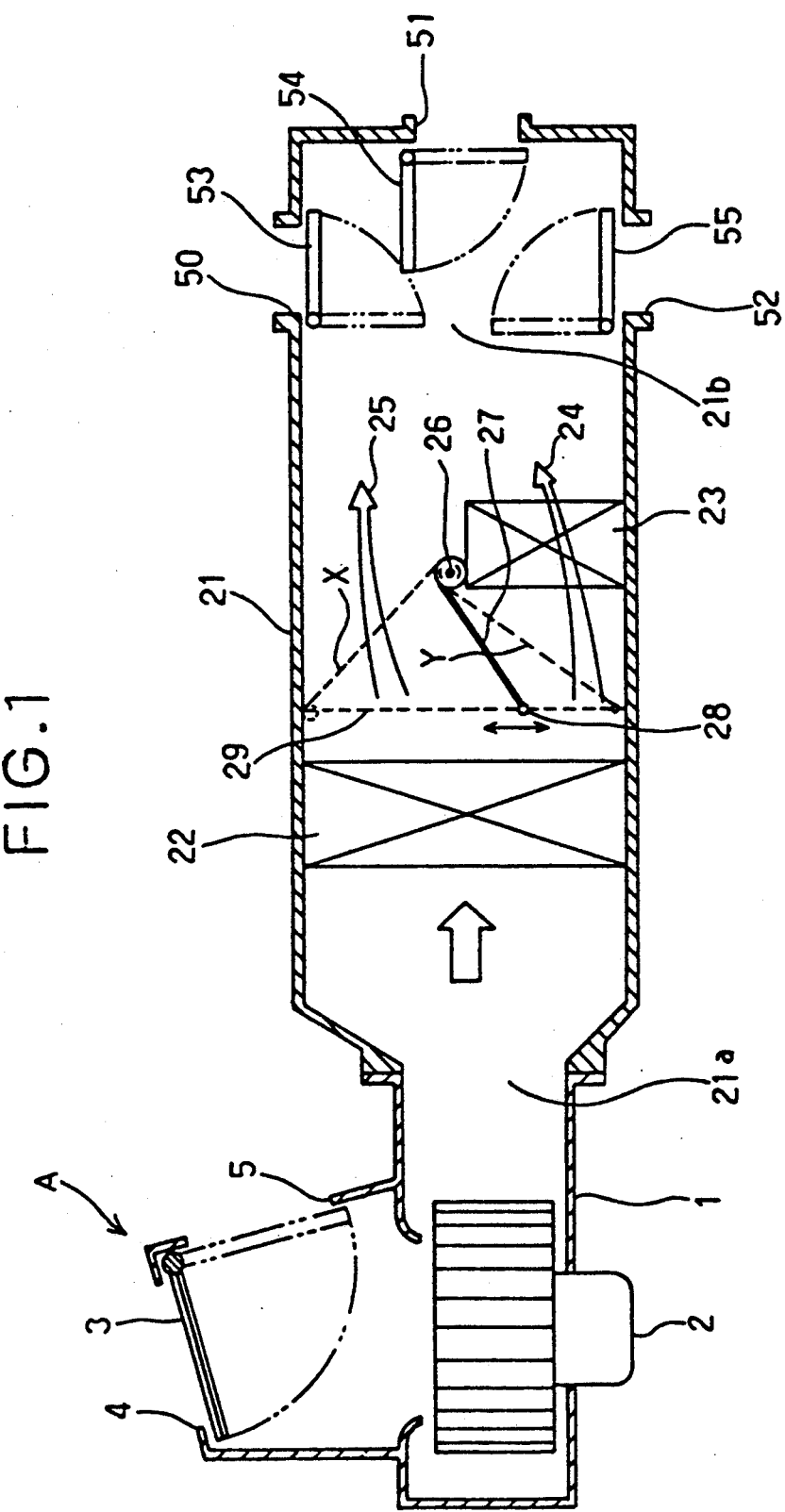
FIG. 1 is a schematic illustration of an air-conditioner according to the present invention.

Referring to FIGS. 1 through 3 of the drawings, an automotive air-conditioner comprises a fan section generally designated by A and an air-conditioning section generally designated by B. The fan section A includes a fan casing 1 which accommodates a centrifugal fan 2. A recirculated air inlet 4 and a fresh air inlet 5 are disposed at an upper portion of the fan casing 1. An air recirculating in a passenger compartment (not shown) is introduced through the recirculated air inlet 4. A fresh air is introduced from outside through the fresh air inlet 5. A change-over damper 3 is pivotally mounted on the fan casing 1. The air inlets 4 and 5 are selectively opened and closed by the change-over damper 3 so that either fresh air or recirculated air is selectively introduced by the fan 2. The fan casing 1 is connected to the duct 21 of the air-conditioning section B through an air inlet 21a such that the air introduced by the fan 2 is discharged into the duct 21.

An air-cooling heat exchanger formed by a refrigerant evaporator 22 is disposed in the duct 21 downstream of the fan 2. An air-heating heat exchanger formed by a heater core 23 is disposed in the duct 21 downstream of the evaporator 22 so as to cover about a half of a cross-sectional area of an air-flow in the duct 21. The air passing through the heater core 23 is heated by engine coolant. All the air from the fan 2 (shown by the arrow in FIG. 1) flows through the evaporator 22. The air passage formed by the duct 21 is defined as a passage having a whole cross-sectional area in the duct 21.

The air passage is divided into a bypass passage 25 and a heated air passage 24. The bypass passage 25 is defined between the heater core 23 and an inner wall of the duct 21 so as to bypass the heater the heater core 23. The heated air passage 24 is defined as an air passage passing through the heater core 23.

The downstream end of the duct 21 is divided into three outlets, namely, a defrosting air outlet 50, a ventilation air outlet 51 and a heated air outlet 52. Mode selecting dampers 53 through 55 are disposed in the duct adjacent to the outlets 50 through 52 respectively and are operatively linked to a mode selection lever (not shown) on a control panel (not shown) so that the dampers 53 through 55 are pivotally moved to selectively open and close the outlets 50 through 52.

An air mix damper comprises a holding shaft 26, a film belt 27 as a variable length damper and a sliding shaft 28.

The holding shaft 26 is rotatably disposed at the edge of the heater core 23, namely at the boundary between the bypass passage 25 and the heated air passage 24. A first end of the film belt 27 is fixed to the holding shaft 26. Referring to FIG. 3, the holding shaft 26 has a spring mechanism (not shown), for example, for applying a tension directed towards the allow shown in FIG. 3 so that the film belt 27 is rolled up by the holding shaft 26. A second end of the film belt 27 is connected to the sliding shaft 28.

The second end of the film belt 27 is bent to make a holding portion 27a in which the sliding shaft 28 is supported.

The both edges of the sliding shaft 28 are connected to endless belts 321 and 322 of a guide 29 as shown in FIG. 2. The guide 29 comprises a shaft 33 at the both ends of which rollers 301 and 302 are rotatably supported and a shaft 34 at its the both ends of which rollers 311 and 312 are fixed. A gear 35 is fixed to the shaft 34 outside of the roller 311. The shaft 33 with rollers 301 and 302 is disposed at the upper portion in the duct 21. The shaft 34 with rollers 311 and 312 and the gear 35 is disposed at the bottom portion in the duct 21 so that both shafts 33 and 34 are portioned in a same plane of the cross-section of the ducts. The rollers 301 and 311 are connected by an endless belt 321. The rollers 302 and 312 are connected by an endless belt 322.

The sliding shaft 28 is fixed at its both edges to endless belts 321 and 322. The sliding shaft 28 slides straightly along a guide 29 formed adjacent to the inner side walls of the duct 21 so that the sliding shaft 28 moves across the air passage in the duct 21.

The movement of the sliding shaft 28 along the guide 29 is controlled by rotation of a motor 37. As the pinion 36 fixed to the rotor axis of the motor 37 is engaged with the gear 35, the rollers 311 and 312 connected coaxially with the gear 35 through the shaft 34 are rotated. The rotation of the rollers 311 and 312 is changed into linear motion of the sliding shaft 28 by using endless belts 321 and 322 so that the sliding shaft 28 moves across the air passage in the duct 21.

The sliding shaft 28 is required to be arbitrarily positioned in response to a control signal.

Therefore a servo motor, a step motor, etc to arbitrarily control a rotation angle thereof are useful for the requirement.

As described above, the sliding shaft 28 slides along the guide 29 between the position X (shown by dashed line in FIG. 1) and the position Y (shown by dashed line) to cross the air passage in the duct 21.

In response to the position of the sliding shaft 28, a distance between the sliding shaft 28 and the holding shaft 26 is varied.

As a tension is always applied to the film belt 27 by a spring mechanism of the holding shaft 26, the film belt 27 is rolled up by the holding shaft 26 to keep the appropriate length of the film belt 27 without slackening. The length of the film belt 27 is varied in response to the distance between the sliding shaft 28 and the holding shaft 26, so that the air from the evaporator 22 flows smoothly along the surface of the film belt 27.

An air-mixing ratio of a heated air passing through the heated air passage 24 and a cooled air passing through the bypass passage 25 is selected in response to the position of the sliding shaft 28.

The operation of the described embodiment of the invention is described hereunder.

MAX HEAT MODE

Figure 4A:
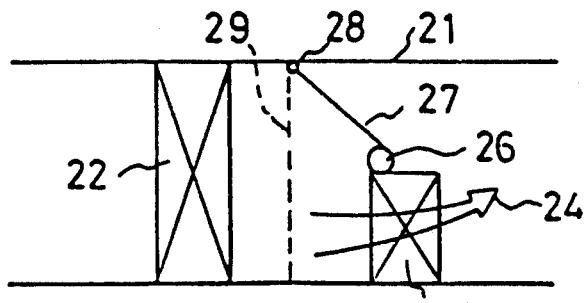
FIG. 4 (A) and FIG. 4 (B) are partial schematic illustrations of the air-conditioner in Max Heat Mode and in Max Cooling Mode respectively.

When the air-conditioner is operated in Max Heat Mode, the film belt 27 is moved to the position X shown by dashed line in FIG. 1 and shown in FIG. 4(a). The film belt 27 is extended to the longest length to close the bypass passage 25. All the air passing through the evaporator 22 flows through the heater core 23. The air heated by the heater core 23 flows into a passenger compartment through the heated air outlet 52 which is selected from the air outlets 50 through 52 by the outlet selection lever.

MAX COOLING MODE

Figure 4B:
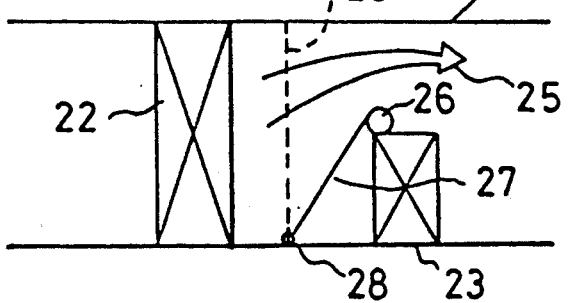

When the air-conditioner is operated in Max Cooling Mode, the film belt 27 is moved to the position Y shown by dashed line in FIG. 1 and shown in FIG. 4(b). The variable length damper 27 is extended to the longest length to cover the heater core 23. All the air passing through the evaporator 22 flows through the bypass passage 25. The air cooled by the evaporator 22 flows into the passenger compartment through the ventilation air outlet 51 which is selected from the air outlets 50 through 52 by the outlet selection lever.

Bi-Level Mode

When the air-conditioner is operated in Bi-Level Mode, the film belt 27 is moved to the position between X and Y, for example, shown in FIG. 1. The sliding shaft 28 is positioned in the middle of the guide 29. The air passing through the evaporator 22 flows through the heated air passage 24 and the bypass passage 25 at an air-mixing ratio determined by the position of the film belt 27. The air passing through the heated air passage 24 is heated by the heater core 23, whereas the air passing through the bypass passage 25 is not heated. The heated air and the cooled air are mixed together in an air-mixing chamber 21b provided in the duct 21 downstream of the heater core 23. The air-conditioner is so controlled that the mixture of the heated and cooled airs is at a desired temperature level.

The mixed air flows into the passenger compartment through the ventilation air outlet 51 and the heated air outlet 52 which is selected from the air outlets 50 through 52 by the outlet selection lever.

The air-conditioner according to the present invention has following advantages. In the conventional air-conditioner which uses a change-over damper as an air-mixing damper requires a distance between an evaporator and a heater core at least the length of the damper itself.

However, as the air-conditioner according to the present invention has a variable length damper as an air-mixing damper, the distance between an evaporator and a heater core is able to set in a shorter distance than the longest length of the film belt 27 so that it is effective in getting a compact air-conditioner.

Furthermore, compared with the conventional air-conditioner, a film damper in Bi-Level Mode blocks only a part of an air passage so that the air-conditioner according to the present invention can reduce a resistance of an air-flow.

Although only one embodiment of the present invention has been described herein, it should be apparent to those skilled in the art that the present invention may be embodied in many other specific forms without departing form the spirit or scope of the invention.

In the above described embodiment, the film belt 27 is used as variable length damper. However, the variable length damper may alternatively use as plate damper 40 as shown in FIGS. 5 through 7.

In this case the plate damper 40 comprises a holding shaft 26, a first and second plates 411 and 412, and a sliding shaft 28.

The holding shaft 26 is fixed at an end of first plate 411. The sliding shaft 28 is integratedly formed on the second plate 412. The first plate 411 has a hollow portion 411a as shown in FIG. 6. The second plate 412 is slidably inserted into the hollow portion 411a to reciprocate along an arrow direction C.

Figure 5:
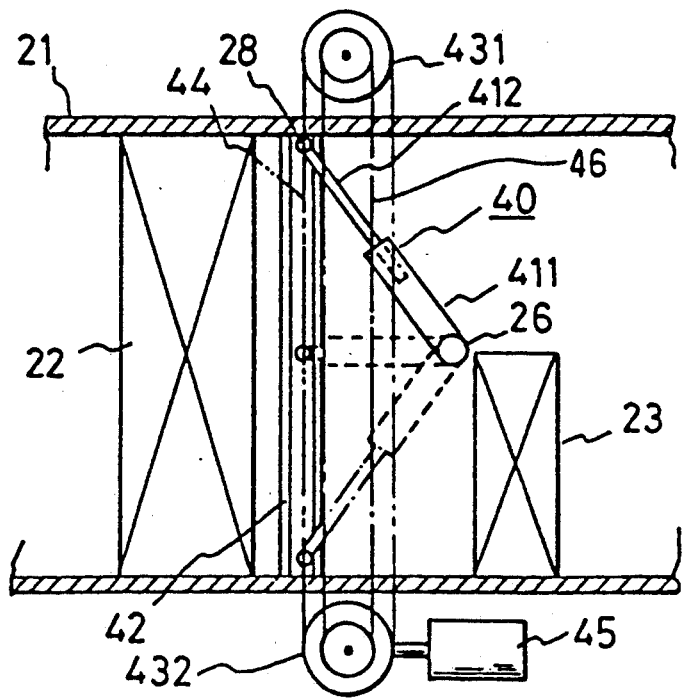
FIG. 5 is a partial schematic illustration of a modified embodiment of the present air-conditioner.
Figures 6, 7:
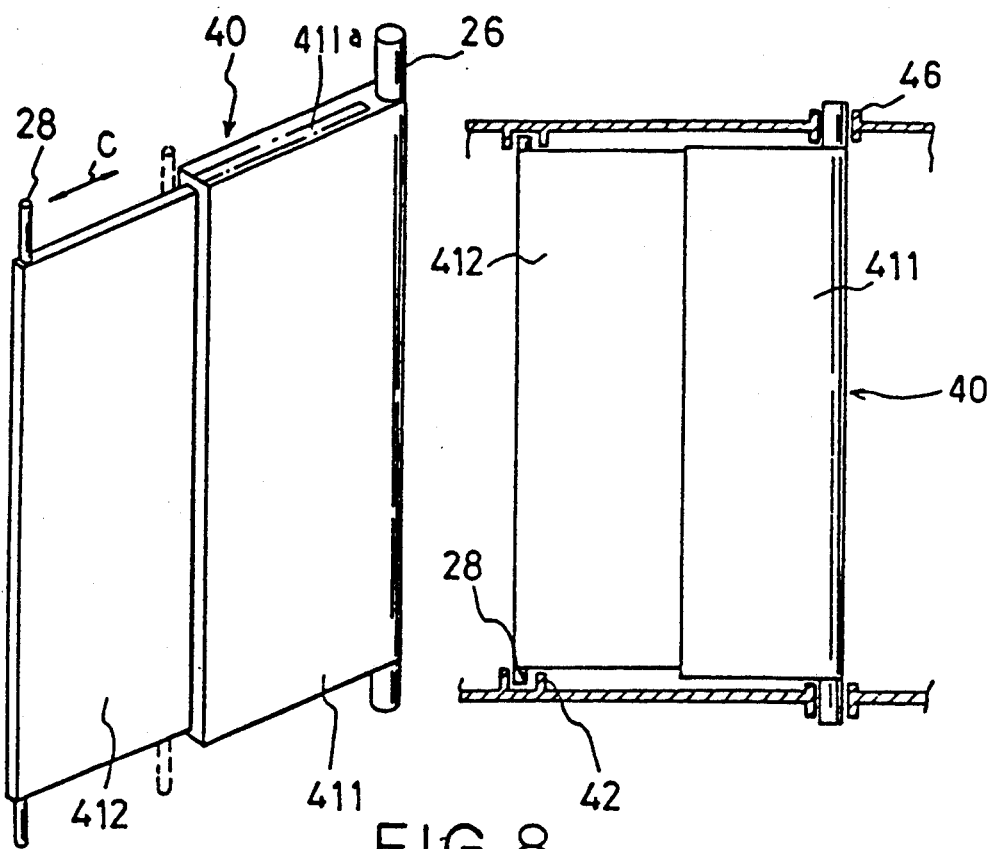
FIG. 6 is a perspective view of a modified variable length damper incorporated in the air-conditioner shown in FIG. 5.
FIG. 7 is a partial cross-sectional view of a duct with a modified variable length damper.
Figure 8:
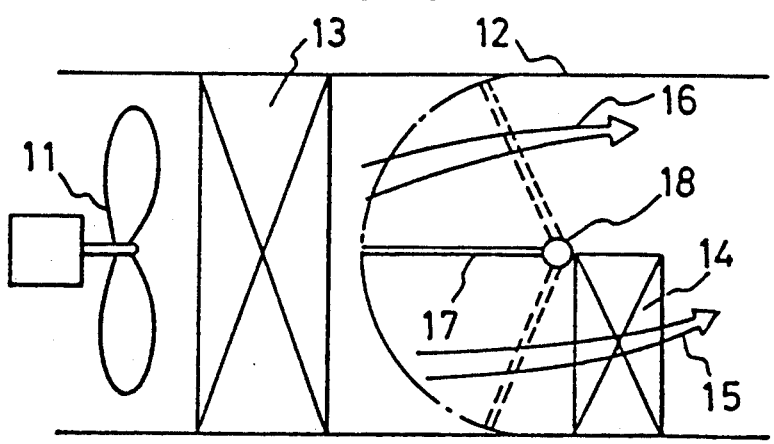
FIG. 8 is a partially schematic illustration of conventional air-conditioner.

A pair of guide slots 42 is formed on the inner side walls of the duct 21 from the upper portion to the lower portion thereof as shown in FIGS. 5 and 7. Both ends of the sliding shaft 28 are slidably inserted in the pair of the guide slots 42.

A pair of holding holes 46 is formed on the side walls of the duct 21. Both ends of the holding shaft 26 are pivotally inserted in the pair of holes 46. As shown in FIG. 5, the sliding shaft 28 is connected to an belt 44. The belt 44 is connected to rollers 431 and 432. The rollers 431 and 432 are connected to an endless belt 46. The roller 432 is driven by a motor 45. The roller 431 is also rotated through the endless belt 46. The belt 44 is moved in response to a rotation of the rollers 431 and 432. As a result, the sliding shaft 28 is slide along the guide slot 42 and is arbitrarily positioned in response to the rotation of the motor. This plate damper 40 as the variable length damper also varies the length thereof in response to a distance between the sliding shaft 28 and the holding shaft 26.

Needless to say, this plate damper 40 described above has the same advantages as those of the first mentioned film damper.

Therefore, the present examples and embodiments are to be considered as illustrative and not restrictive and the invention is not to be limited to the details given herein, but may be modified within the scope of the appended claims.

What is claimed is:

1. An air-conditioner comprising:
an air passage through which an air passes;
an evaporator provided within said air passage for cooling the air;
a heater core disposed downstream of said evaporator for heating the air passing therethrough;
said heater core provided in a part of said air passage so that a bypass passage through which the air flows is formed within said air passage at a side portion of said heater core;
a holding shaft disposed within said air passage at the boundary between an air-flow passing through said heater core and an air-flow passing through said bypass passage;
a sliding shaft disposed downstream of said evaporator, upstream of said heater core and upstream of said bypass passage and sliding within said air passage in such a manner that said sliding shaft crosses a substantially whole area of said air passage; and
a variable length damper having a first damper end and a second damper end, said first damper end and said second damper end being connected to said sliding shaft and said holding shaft respectively, said variable length damper varying the length thereof so as to connect straightly between said holding shaft and said sliding shaft, said holding shaft, said sliding shaft and said variable length damper being arranged such that a volume of the air passing through said heater core and a volume of the air passing said bypass passage are modulated by said variable length damper.

2. An air-conditioner according to claim 1, wherein said variable length damper is made of a flexible belt.

3. An air-conditioner according to claim 2, wherein said film damper is rolled by said holding shaft so that a tension is always applied in a direction toward said holding shaft.

4. An air-conditioner according to claim 1, wherein said sliding shaft is driven by a motor controlled by an external signal through a transmission means.

5. An air-conditioner according to claim 4, wherein said transmission means comprises a gear, an endless belt, a pinion, a shaft and a roller.

6. An air-conditioner according to claim 1, wherein a distance between said evaporator and said heater core is shorter than the longest length of said variable length damper.

7. An air-conditioner according to claim 1, wherein said variable length damper comprises a first damper plate connecting to said holding shaft and a second plate having a first end slidably connected to said first damper plate and a second end connected to said slidably shaft.

8. An air-conditioner according to claim 6, wherein said first damper plate has a hollow portion and said second damper plate is slidably inserted into said hollow portion.

9. An air-conditioner according to claim 1, wherein a locus of said sliding shaft is in a non-circular arc.

10. An air-conditioner according to claim 1, wherein a distance between said holding shaft and said sliding shaft is varied in response to a position of said sliding shaft.

11. An air-conditioner according to claim 1, wherein said sliding shaft slides along a guide slot formed on the duct.

12. An automotive air-conditioner comprising:
an air passage through which an air passes;
a heater core disposed within said air passage for heating the air passing therethrough;
said heater core provided in a part of said air passage so that a bypass passage through which the air flows is formed within said air passage and at a side portion of said
a holding shaft disposed within said air passage and heater core; at the boundary between an air-flow passing through said heater core and an air-flow passing through said bypass passage;
a sliding shaft disposed upstream of said heater core and said bypass passage and sliding within said air passage in such a manner that said sliding shaft crosses a substantially whole area of said air passage; and
a variable length damper having a first damper end and a second damper end, said first damper end and said second damper end being connected to said sliding shaft and said holding shaft respectively, said variable length damper varying the length thereof so as to connect straightly between said holding shaft and said sliding shaft, said holding shaft, said sliding shaft, and said variable length damper being arranged such that a volume of the air passing through said heater core and a volume of the air passing said bypass passage are modulated by said variable length damper.

* * * * *